(12) United States Patent
Achlioptas (10) Patent No.: US 9,367,850 B2
(45) Date of Patent: Jun. 14, 2016

(54) SMART BUTTON

(75) Inventor: Dimitris Achlioptas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 12/347,237

(22) Filed: Dec. 31, 2008

(65) Prior Publication Data

US 2009/0112785 A1    Apr. 30, 2009

Related U.S. Application Data

(63) Continuation of application No. 10/675,125, filed on Sep. 30, 2003.

(51) Int. Cl.
  *G06F 15/16* (2006.01)
  *G06Q 30/02* (2012.01)

(52) U.S. Cl.
  CPC ........................ *G06Q 30/02* (2013.01)

(58) Field of Classification Search
  USPC ............................ 707/999.003; 709/229, 248
  See application file for complete search history.

(56) References Cited

U.S. PATENT DOCUMENTS

| | | | |
|---|---|---|---|
| 6,021,403 A | 2/2000 | Horvitz et al. | |
| 6,115,709 A | 9/2000 | Gilmour et al. | |
| 6,269,369 B1 | 7/2001 | Robertson | |
| 6,288,717 B1 | 9/2001 | Dunkle | |
| 6,366,956 B1 | 4/2002 | Krishnan | |
| 6,487,541 B1 | 11/2002 | Aggarwal et al. | |
| 6,493,702 B1 | 12/2002 | Adar et al. | |
| 6,582,475 B2 | 6/2003 | Graham et al. | |
| 6,594,673 B1 | 7/2003 | Smith et al. | |
| 6,681,108 B1 | 1/2004 | Terry et al. | |
| 6,714,916 B1 | 3/2004 | Robertson et al. | |
| 6,970,879 B1 | 11/2005 | Gilmour | |
| 7,024,404 B1 | 4/2006 | Gerasoulis et al. | |
| 7,031,952 B1 | 4/2006 | Heumann et al. | |
| 7,031,961 B2 * | 4/2006 | Pitkow et al. | |
| 7,039,639 B2 | 5/2006 | Brezin et al. | |
| 7,177,880 B2 | 2/2007 | Ruvolo et al. | |

(Continued)

OTHER PUBLICATIONS

Henry Kautz, et al.; "Combining Social Networks and Collaborative Filtering", Communications of the AMC, Mar. 1997, pp. 63-65, vol. 40, No. 3.

(Continued)

*Primary Examiner* — Scott B Christensen
(74) *Attorney, Agent, or Firm* — Dan Choi; Judy Yee; Micky Minhas (57) ABSTRACT

The present invention provides for systems and methods that facilitate conveying user information between and among users effectively to thereby create a collaborative filtering environment with maintained user privacy. More specifically, the present invention allows user-profile building to occur coincident with user-browsing, for example. This can be accomplished in part by incorporating an input component on the user interface used for browsing and/or searching. A user who has opted-in to construct a personal profile makes declarations regarding his relationship with at least a portion of the information being currently viewed. The declarations are annotated to the user's profile. At the user's discretion, the user's profile can be disseminated to others in whole or in part such that other people can make use of the user's expertise, experience or opinions. In addition, the user profiles can be machine-readable and searchable.

20 Claims, 8 Drawing Sheets

(56) References Cited

U.S. PATENT DOCUMENTS

| | | | |
|---|---|---|---|
| 7,343,365 | B2 | 3/2008 | Farnham et al. |
| 7,472,110 | B2 | 12/2008 | Achlioptas |
| 7,539,697 | B1 | 5/2009 | Akella et al. |
| 2002/0054089 | A1 | 5/2002 | Nicholas et al. |
| 2002/0065802 | A1 | 5/2002 | Uchiyama |
| 2002/0103792 | A1 | 8/2002 | Blank et al. |
| 2002/0122067 | A1 | 9/2002 | Geigel et al. |
| 2002/0157026 | A1 | 10/2002 | Brown |
| 2002/0169737 | A1 | 11/2002 | Armstrong et al. |
| 2002/0174144 | A1 | 11/2002 | Wolpe |
| 2002/0178161 | A1 | 11/2002 | Brezin et al. |
| 2002/0194178 | A1 | 12/2002 | Gilmour et al. |
| 2003/0014395 | A1 | 1/2003 | Ruvolo et al. |
| 2003/0030666 | A1 | 2/2003 | Najmi et al. |
| 2003/0038840 | A1 | 2/2003 | Stern |
| 2003/0061206 | A1 | 3/2003 | Qian |
| 2003/0080995 | A1 | 5/2003 | Tenenbaum et al. |
| 2003/0158855 | A1 | 8/2003 | Farnham et al. |
| 2003/0167324 | A1 | 9/2003 | Farnham et al. |
| 2003/0169737 | A1 | 9/2003 | Lavigne et al. |
| 2003/0210280 | A1 | 11/2003 | Baker et al. |
| 2004/0032393 | A1 | 2/2004 | Brandenberg et al. |
| 2004/0068477 | A1 | 4/2004 | Gilmour et al. |
| 2004/0111386 | A1 | 6/2004 | Goldberg et al. |
| 2004/0122803 | A1 | 6/2004 | Dom et al. |
| 2004/0122855 | A1 | 6/2004 | Ruvolo et al. |
| 2004/0165010 | A1 | 8/2004 | Robertson et al. |
| 2005/0010451 | A1 | 1/2005 | Marks et al. |
| 2006/0085370 | A1 | 4/2006 | Groat et al. |
| 2006/0236249 | A1 | 10/2006 | Weissman |
| 2007/0016856 | A1 | 1/2007 | Graham et al. |

OTHER PUBLICATIONS

Henry Kautz, et al.; "The Hidden Web", 1997, pp. 27-36.

Henry Kautz, et al.; "Creating Models of Real-World Communities with ReferralWeb", 1998.

Jon Kleinberg; "The Small-World Phenomenon: an Algorithmic Perspective", 2000, pp. 1-14.

M. E. J. Newman; "Small Worlds: The Structure of Social Networks", 2000, pp. 1-8.

John Schneider, et al.; "Disseminating Trust Information in Wearable Communities", 2000, pp. 1-5.

Alfarez Abdul-Rahman, et al.; "Supporting Trust in Virtual Communities", 2000.

David W. McDonald, et al.; "Just Talk to Me: A Field Study of Expertise Location", Nov. 14-18, 1998, pp. 1-10.

Keith N. Hampton, et al.; "Netville On-line and Off-line", American Behavioral Scientist, Nov. 1999, pp. 475-492, vol. 43, No. 3.

Emmanuel F. Koku, et al.; "Scholarly Networks as Learning Communities: The Case of TechNet", Jan. 2002, pp. 1-36.

Valdis Krebs; "The Social Life of Routers: Applying Knowledge of Human Networks to the Design of Computer Networks", The Internet Protocol Journal, Dec. 2000, pp. 15-25, vol. 3 , No. 4.

Final OA mailed Feb. 2, 2007 for U.S. Appl. No. 10/353,623, 22 pages.

Final OA mailed Nov. 9, 2005 for U.S. Appl. No. 10/353,623, 21 pages.

Final OA mailed Jan. 25, 2008 for U.S. Appl. No. 10/353,623, 24 pages.

OA mailed Jul. 22, 2005 for U.S. Appl. No. 10/353,623, 16 pages.

OA mailed Aug. 18, 2006 for U.S. Appl. No. 10/353,623, 16 pages.

OA mailed Jul. 31, 2007 for U.S. Appl. No. 10/353,623, 18 pages.

Final OA mailed Jan. 16, 2007 for U.S. Appl. No. 11/257,429, 12 pages.

Final OA mailed Jan. 9, 2008 for U.S. Appl. No. 11/257,429, 18 pages.

OA mailed Jul. 21, 2006 for U.S. Appl. No. 11/257,429, 12 pages.

OA mailed Jul. 19, 2007 for U.S. Appl. No. 11/257,429, 12 pages.

Final OA mailed Mar. 18, 2008 for U.S. Appl. No. 10/675,125, 33 pages.

Final OA mailed Dec. 10, 2008 for U.S. Appl. No. 10/675,125, 20 pages.

OA mailed Jun. 2, 2008 for U.S. Appl. No. 10/675,125, 34 pages.

OA mailed Sep. 14, 2007 for U.S. Appl. No. 10/675,125, 23 pages.

OA mailed Feb. 2, 2011 for U.S. Appl. No. 10/675.125, 14 pages.

Final Office Action for U.S. Appl. No. 10/675,125, mailed on Sep. 22, 2011, Dimitris Achlioptas, "Smart Button", 13 pages.

Office action for U.S. Appl. No. 10/675,125, mailed on May 2, 2014, Achlioptas, "Smart Button", 14 pages.

Office Action for U.S. Appl. No. 12/344,877, mailed on Apr. 26, 2011, Dimitris Achlioptas, "System and Method for Employing Social Networks for Information Discovery", 8 pgs.

Office Action for U.S. Appl. No. 12/344,877, mailed on Oct. 25, 2011, Dimitris Achlioptas, "System and Method for Employing Social Networks for Information Discovery", 14 pgs.

Office action for U.S. Appl. No. 10/675,125, mailed on Nov. 20, 2013, Achlioptas, "Smart Button", 13 pages.

Office Action for U.S. Appl. No. 11/257,429, mailed on Apr. 18, 2012, Dimitris Achlioptas, "System and Method for Employing Social Networks for Information Discovery", 12 pgs.

* cited by examiner

SMART BUTTON

CROSS-REFERENCE TO RELATED APPLICATIONS

This application is a continuation application of U.S. patent application Ser. No. 10/675,125 filed on Sep. 30, 2003 and entitled "SMART BUTTON." The entirety of the aforementioned application is incorporated herein by reference.

TECHNICAL FIELD

This invention relates to conveying information among and between computer users, and in particular, to enabling and/or improving user interaction and sharing of user opinions in a privacy-preserving manner.

BACKGROUND OF THE INVENTION

Over the past several years, Internet usage and the vast amounts of information available on the Internet has risen dramatically. Businesses, consumers, as well as students of all ages are able to take advantage of the plethora of products, services, and reference materials with relative ease. However, when it comes to searching or researching particular services or products to purchase either on-line or in an actual store, for example, the task of browsing the Internet can be rather daunting. This is due in part to the variety and seemingly infinite number of choices of products, services and companies and the overwhelming amount of advertising.

Some sites offer customer reviews on given products or services to make a buyer's selection easier. However, even with such customer reviews, it is difficult to know or determine from what perspective the reviewer is speaking. This is because the reviewer is only revealing one somewhat narrow aspect of himself; hence, it is nearly impossible to fully appreciate or apply the review to other buyers' needs. Perhaps the dissatisfied reviewer has different needs, different preferences or different expectations than the other buyers. Likewise, a satisfied reviewer could have different expectations (e.g., lower), different needs and/or different long-term goals than the other buyers. Thus, these common customer review formats may not be very useful to most shoppers, browsers, and Internet users, in general.

Moreover, considerable efforts are directed to building profiles of users to facilitate navigating among users and/or entities and/or data in the Internet space. Profiles greatly facilitate such navigation in that they serve not only as filters but block or redirect queries along more relevant paths, but also as beacons to guide access thereto when appropriate. However, with respect to user's profiles where control thereof by a user is desired, the profiles often need to be substantially populated before a system or method employing such profiles can be utilized. In view of the above, let alone the privacy concerns associated with third-party generated profiles of individuals, there is a need for a system and/or method that facilitates a user's controlling his/her respective profile generation and management.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for systems and/or methods that generate and populate a comprehensive schema that facilitates semantic agreement between users' descriptions of objects and enables powerful user-based queries. The invention provides in part for building a taxonomy (e.g., XML-based) that users can employ to define themselves. One particular aspect of the invention provides for employing a input component (e.g., UI button(s), speech input, keystroke . . . ) that can be activated/invoked while reviewing/accessing content (e.g., websites, news, audio, media, documents, data . . . ) so as to make an affirmative declaration about the user's opinion, preference, statement . . . with respect to the content. Such real-time, dynamic, and pseudo-passive means for declaration facilitates rapidly building the taxonomy with data the user(s) deem accurate and highly reliable.

One particular aspect of the invention provides for systems and methods that facilitate conveying user information between and among users effectively to thereby create a collaborative filtering environment with maintained user privacy. More specifically, the present invention allows user-profile building to occur coincident with user-browsing, for example. This can be accomplished in part by incorporating the aforementioned input component such as a button on the user interface or any other window used for browsing and/or searching.

A user can shape his/her own private profile in a relatively passive or implicit manner such as when browsing the internet. Initially, a private profile can be blank to simply represent a generic person. As the user begins to browse on a particular website, a button on the user interface could be made available for the user to push to indicate a relationship with or an opinion of the web site or of some portion of the website. With each button push, the user continues to annotate and shape his/her own user profile such that after some time, the profile essentially becomes more personalized and/or specific to the user since it apparently identifies various characteristics of the user in terms of his/her relationships with particular websites. Such a profile can be employed to help the user to be identified by others who would like to tap into the user's opinions and/or expertise.

According to another aspect of the invention, the private profiles of each user can be edited by the respective user and can also be made accessible to others by an opt-in selection. Viewing these private profiles by other users facilitates the other users' browsing experience as they browse or search across the internet or through information. For instance, the private profile of user A can assist user B in deciding whether to consider website K for purchasing a stereo.

In yet another aspect, one or more input components can be employed to facilitate the self-annotation process of each user's private profile. The input components can include semantic-centric input components which illustrate a more specific opinion or relationship between the user and the content or context of the website, for example. Thus, a relatively generic button could reflect "I'm into this" whereas a semantic-centric input component can read "I own this" or "I love this band".

In still another aspect of the invention, an extraction component can be utilized to further optimize the self-annotation process. In particular, the extraction component can analyze a web page, for instance, and extract some semantic component(s) of at least a portion of the page. These semantic components extracted from the web page can be employed in generating input components. The input components can be morphed automatically to reflect the semantic components with each particular page that comprises different information.

Finally, another aspect of the present invention includes an inference component involving artificial intelligence techniques. After some time of learning and analyzing the user's selections and declarations with respect to the various input components presented thereto, the inference component can be trained to make declarations (e.g., push the button(s)) on behalf of the user without physical input by the user. Thus, generation of the user's profile can be even more effortless and implicit as the user peruses the internet, for example.

Moreover, the present invention enhances a user's ability to declare information about himself that is useful to both him as well as to others and to convey that useful information to others in real time.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Accordingly, it is to be appreciated that various aspects of the subject invention can employ probabilistic-based and/or statistical-based classifiers in connection with making determinations and/or inferences in connection with the subject invention. For example, such classifiers can be employed in connection with utility-based analyses described herein. A support vector machine (SVM) classifier can be employed—an SVM generally operates by finding a dynamically changing hypersurface in the space of possible inputs. Other directed and undirected models/classification approaches include, e.g., naïve Bayes, Bayesian networks, decision trees, Hidden Markov Model (HMM), data fusion engine, neural network, expert system, fuzzy logic, or any suitable probabilistic classification models providing different patterns of independence can be employed. Classification as used herein also is inclusive of statistical regression that is utilized to develop models of priority.

Figure 1:
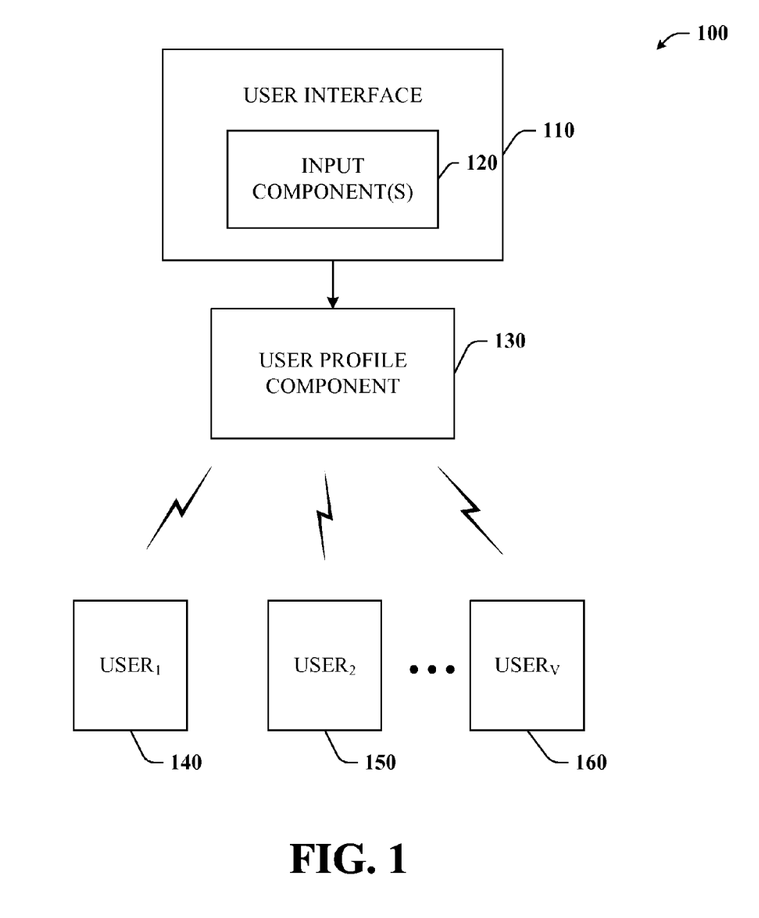
FIG. 1 is a general block diagram of a system that facilitates conveying information about a user's experience from the user to other users in accordance with an aspect of the present invention.

Referring now to FIG. 1, there is illustrated a general block diagram of a system 100 that facilitates gathering amounts of useful information in an implicit manner and then conveying that information to others on a real time basis. The system comprises a user interface 110 and one or more input components 120 located thereon. The one or more input components 120 can be utilized to enter data or information into a user profile component 130 that is also included in the system 100. The input components 120 can be for example in the form of buttons and/or selection boxes (e.g., "check here", "click here", . . . ). It is to be appreciated that any suitable device (e.g., microphone, keyboard, mouse, proxy device, wand, pointing device, optical pen, tracking system, sensors . . . ), system/device for monitoring user focus of attention as well as intention, scheme, application, classifiers, and/or methodology to facilitate a user making declarations in accordance with the subject invention can be employed and are considered to fall within the scope of the hereto appended claims.

The profile component 130 gathers and stores information derived from a user's activation/invocation (e.g., click) of the one or more input components 120. For example, imagine that the user interface 110 is a browser such as a web browser. At least one button is positioned on the web browser, wherein the semantics associated therewith can change from one website or page to the next, as the content changes. When the user visits a certain page, a click of the button can be equivalent to the user declaring "I have an opinion about the subject matter expressed in this page that I would be willing to share with others." The opinion can be as general as "I am into this" or "I care about this".

Alternatively or in addition, the button and corresponding declaration can be more specific, based at least in part upon content analysis of at least a portion of the page, such as "I have been there", "I have read this book", "I love this brand" and the like. These declarations are annotated to the user's personal profile as the user browses from webpage to webpage (and/or website to website). It should be appreciated, however, that the user's participation in creating his personal profile in this manner can be optional and confirmed by an opt-in mechanism. Furthermore, it should be appreciated that the user can selectively decide when to make declarations.

Similarly, the user can decide whether to allow other users (e.g., by way of their computers), such as $USER_1$ 140, $USER_2$ 150, . . . and up to $USER_V$ 160 (where V is an integer greater than or equal to one), to have access to the user's profile. That is, the privacy of the user's profile can be maintained and controlled by the user. For example, the user may restrict viewing of his profile in whole or in part to other participating users. Alternatively, a user may grant other users' computers the right to query his/her profile with respect to certain specific questions, without allowing other users and/or their computers to browse the entire profile. Alternatively, the user may grant viewing rights to all other users who request to see the profile in whole or in part. In addition, the user's profile can be readily available without making a request to the particular user.

Furthermore, the user-created profiles can be accessed, read, and searched by machines (e.g., computers). This can be particularly important such as when the profiles are in a format not readable by humans. For example, when a particular user makes his/her profile available to other people, computers that are owned by these people can search through the user profiles for information that may be desirable to their respective owners. The desirable information can be on a certain subject such as 1960's cars. When a near-match or match is found, the computer can notify that particular owner that a specific user(s) can be contacted when searching for information on 1960's cars.

In practice, imagine that a parent is looking for information on private schools in the city. As soon as the parent initiates a search of private schools, the parent's computer can search through other user profiles on that topic. When results to the computer's search are obtained, the parent's computer can notify the parent that other users may have information (e.g., ranging from a little, some, to a large amount) on private schools in the city. The parent could then be provided with a means to contact the user and/or can be provided.

Figure 2:
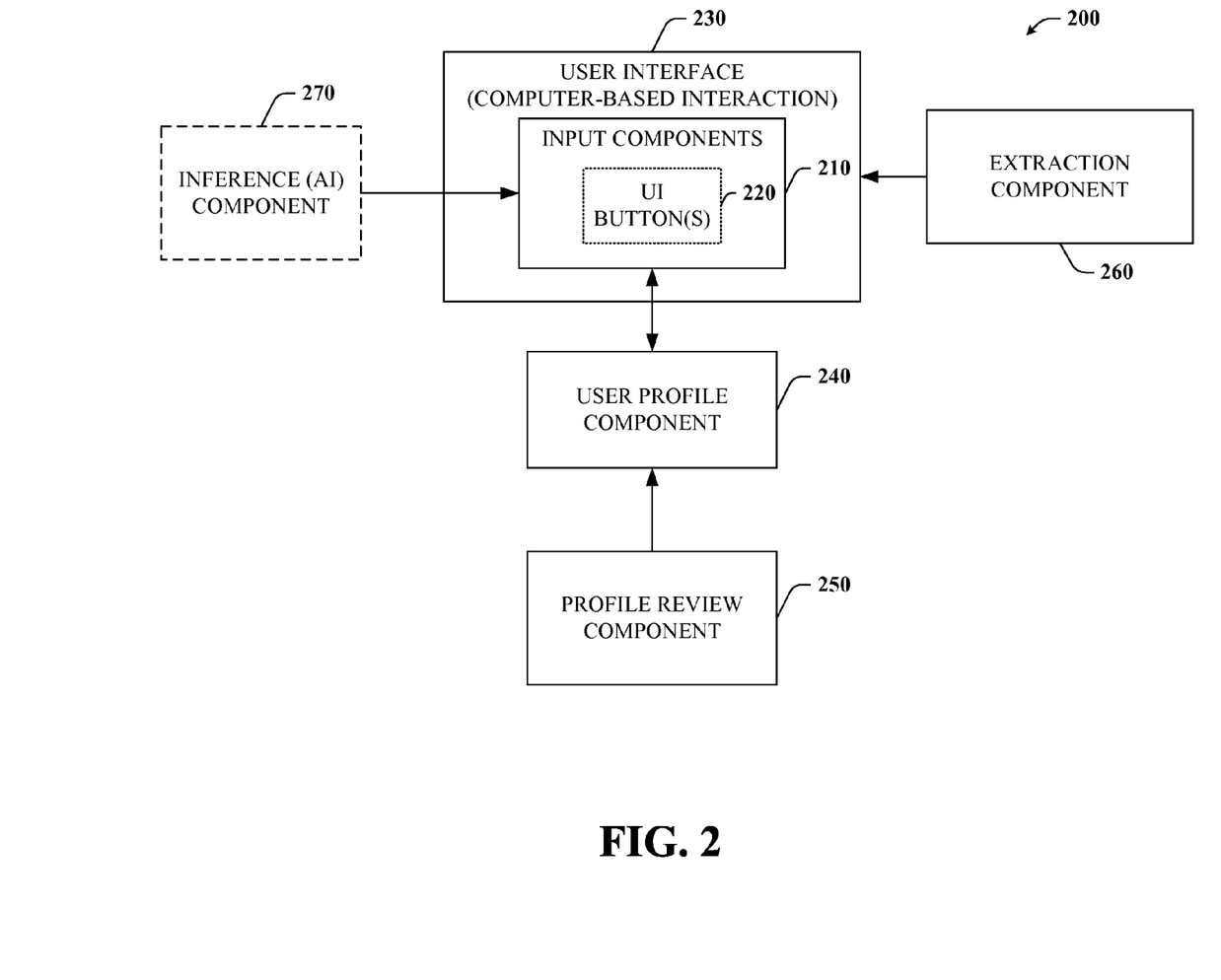
FIG. 2 is a schematic block diagram of a system that facilitates conveying information about a user's experience from the user to other users in accordance with an aspect of the present invention.

Referring now to FIG. 2, there is illustrated a schematic block diagram of an exemplary system 200 comprising an adaptive or morphing input component 210 in accordance with an aspect of the present invention. The input component 210 can appear as one or more buttons 220 located on a user-interface 230 displaying a computer-based interaction, action, or application. Examples of a computer-based interaction, action or application include web pages, websites, a search engine display, and/or a search results display whereby a user is interacting with a computer in some manner in order to view and/or obtain data or information from the computer.

As mentioned above with respect to FIG. 1, each additional click of at least one button 220 further annotates a user's personal profile by way of a user profile component 240. The user profile component 240 can populate the user's profile as new declarations, opinions, and/or relationships are classified and made by the user. The user's profile can be reviewed and/or edited by the user or by any other person granted access by the user by way of a profile review component 250. The profile review component 250 controls the user's ability to review and/or modify the user's personal profile. Modifications to the profile can be desired or necessary in cases where the user inadvertently selects a wrong button, thereby making an inaccurate declaration. Other situations may also arise warranting a change and/or correction to the user's profile.

As the user searches or browses through various pages of information, whether it is on a web browser or some other search or browser system, the user may find that he has at least one special relationship with at least a portion of the content on a given page. That special relationship can be described in relatively generic terms such as "This is interesting to me". Alternatively or in addition, the relationship (e.g., semantics) can be more specific to the particular page the user is viewing. For instance, on a page of movie listings, one relationship could be "I liked this movie" or "I am going to see this movie". Another could simply be "positive opinion" or even "negative opinion". Furthermore, each movie could have an input component adjacent thereto, for example, so that it is even more specific as to which movie the user was referring. Thus, the input components 210 can be described as being semantic-centric since the semantics associated with the respective page or user interface 230 can automatically or manually cause the button(s) 220 to morph based upon at least some content of the user interface 230.

The content analysis can be performed at least in part by an extraction component 260. The extraction component 260 can be operatively coupled to the user interface and can extract and/or analyze at least a portion of the content of the user-interface 230 and/or computer-based interaction 230. Such analysis can facilitate narrowing the number of special relationships or declarations that the user can make about the content displayed on the user-interface 230. This narrowing may further be determined at least in part by examining the types of declarations or relationships the user has classified in the past. A separate analyzing component (not shown) can be integrated within or connected to the user profile component 240 to perform an examination of at least a portion of the user's profile.

Finally, the system 200 can optionally include an inference or AI (artificial intelligence) component 270. The AI component 270 can comprise classifiers such as for example a Bayesian classifier, a support vector machine, and/or other type of classifier and/or other non-linear training system(s). The AI component 270 can facilitate performing inferences and/or user declarations and/or selections in accordance with the subject invention. For example, the AI component 270 can make a declaration/selection on behalf of the user in connection with annotating the user's profile and can infer when and what type of declaration to make. For example, the user may tend to not make a declaration on every website, such as when the user spends substantially no time on the page or when the user quickly moves onto to another page or site (e.g., as determined in part by analyzing time spent on various pages where declarations are and are not made) or simply because the user chooses to not make a declaration. This can also include instances of the user unintentionally going to the page or site either by the user's own mistake or by being redirected by the computer.

Various extrinsic factors (e.g., state of user, historical information, type of information received . . . ) can be employed in connection with the inference/analysis. For example, correctly inferring a user's declaration can optimize population and/or annotation of the user's profile. Additionally, factoring in the cost of making an incorrect inference versus the benefit of a correct inference can further facilitate a utility-based approach of the invention. For example, incorrect inferences can require the user to explicitly re-enter or correct the wrong declaration. Furthermore, reliability of the users profile may decrease particularly from the perspective of other users.

The AI component 270 can be trained explicitly as well as implicitly to facilitate optimal annotation of the user's profile made on behalf of the user, to mitigate inconsistent or inaccurate annotations made on behalf of the user, and to facilitate optimal sharing of a user's profile with other qualified users (e.g., users granted access to other users' profiles) in accordance with the subject invention. The AI component 270 can be operatively connected to the user interface 230 and/or the input component(s) 210 and can perform inference and utility-based determinations with respect to the functionality of the respective components. It is to be appreciated that inferences and/or determinations in accordance with the subject invention can be probabilistic-based, statistical-based, and/or rules-based, for example.

Figure 3:
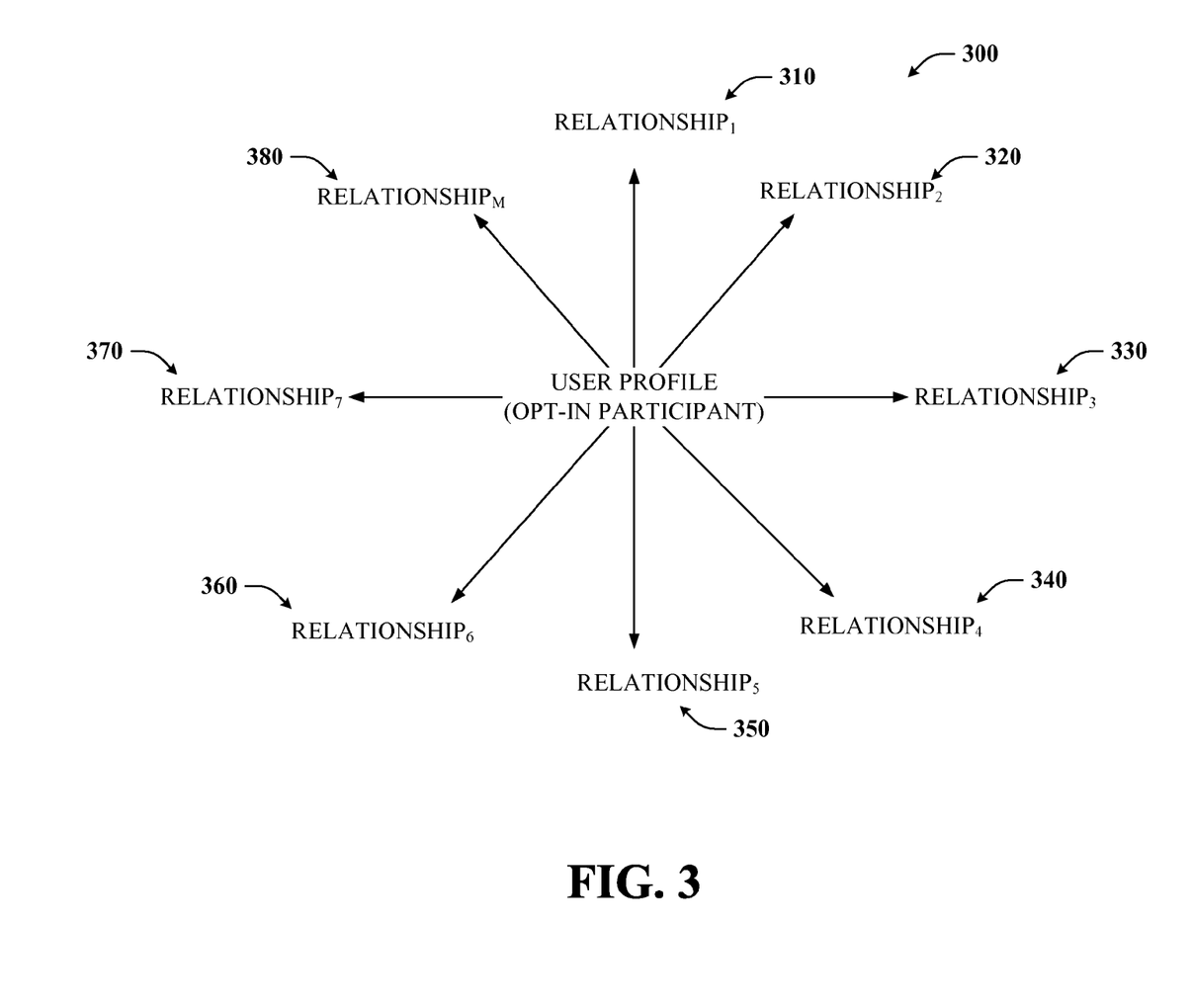
FIG. 3 is a schematic diagram of an exemplary private profile created by a user in accordance with an aspect of the present invention.

Turning now to FIG. 3, there is illustrated a schematic diagram demonstrating an exemplary personal profile 300 as created and annotated by a user. Initially, the user can be required to affirmatively opt-in to a user-profile system (e.g., FIGS. 1 and 2, supra) before being given the opportunity to declare his opinions on various subject matter while browsing, for example. The user's affirmative agreement to opt-in can then cause one or more input components (e.g., FIG. 1, 120; FIG. 2, 210 and 220—supra) to conspicuously appear on the user interface or window.

The user profile 300 can be populated with one or more declarations, opinions, and/or relationships as determined by the respective user. In particular, when viewing a page such as when web-browsing, the user can have a special "relationship" with that page, or more importantly, with the contents of the page, which can be useful to others in many different ways, such as those who would like to benefit from a real person's expertise, experience, and opinion. However, unless that special relationship is classified by the user in some way, the information is useless to others. Thus, clicking on a button to indicate that the contents of a page are interesting can provide other users with useful information that may assist them in their lives in some positive manner.

In some cases, any number of pages viewed by a user can yield additional relationships which can be summarized down to a single declaration, for instance, and then annotated to the user's profile either by the user—such as when prompted—or by an inference component (e.g., FIG. 2, 270—supra).

As shown in FIG. 3, the user profile 300 comprises RELATIONSHIP$_1$ 310, RELATIONSHIP$_2$ 320, RELATIONSHIP$_3$ 330, RELATIONSHIP$_4$ 340, RELATIONSHIP$_5$ 350, RELATIONSHIP$_6$ 360, RELATIONSHIP$_7$ 370, . . . and up to RELATIONSHIP$_M$ 380, where M is an integer greater than or equal to one. Though a plurality of relationships are shown, the user profile 300 can contain as few as one relationship and still be useful to others. However, as the number, and thus the quality, of declarations increases, the usefulness and value of that user's profile increases for the benefit of others. This is due in part to the fact that others can get a better sense or perspective of the user's overall expertise, experiences, or opinions when more information is known about the user.

In practice, the user can passively create his/her own personal profile such as while browsing the internet. For instance, imagine that as the user begins to browse on a particular website, a button on the user interface could be made available for the user to push to indicate a relationship with the web site or of some portion of the website. With each button push, the user continues to annotate and shape his/her own user profile such that after some time, the profile essentially becomes more personalized and/or specific to the user since it apparently identifies various characteristics of the user in terms of his/her relationships with particular websites.

Such a profile can be employed to assist the user in being identified by others who would like to tap into the user's opinions and/or expertise. In particular, computers owned by others can search user profiles and then notify their respective owners that at least one other user may have information or expertise on a desirable topic. For example, imagine that user G has created a personal profile comprising a plurality of declarations for a variety of subject matter. Computers owned by other people such as owners D, F, and J can access and read G's profile as well as other user profiles; and then notify their respective owners that they may want to contact G when searching for information on a particular topic.

Figure 4:
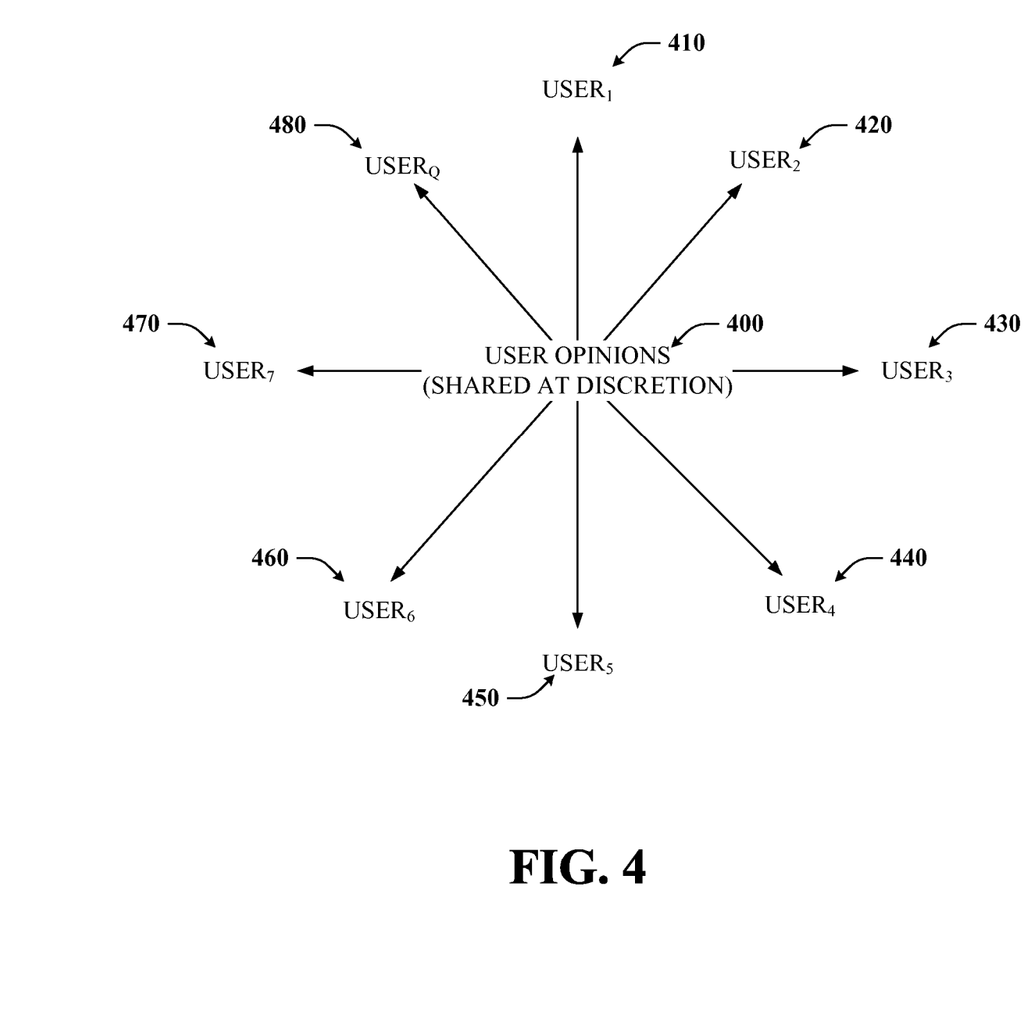
FIG. 4 is a schematic diagram of a user's private or personal profile in relation to other users in accordance with an aspect of the present invention.

Referring now to FIG. 4, there is illustrated a schematic diagram of an exemplary portrayal of the interaction between a user's profile 400 and one or more other users and/or their respective computers. For example, computers owned or employed by USER$_1$ 410, USER$_2$ 420, USER$_3$ 430, USER$_4$ 440, USER$_5$ 450, USER$_6$ 460, USER$_7$ 470, . . . and up to USER$_Q$ 480, where Q is an integer greater than or equal to one, can all have access to the user's profile 400. However, to maintain privacy of the user's profile 400, the user (400) can grant, deny, and/or withdraw accessibility to his profile 400 in whole or in part at any time.

Moreover, a collaborative filtering environment can be created by the interaction between users and their respective user profiles, whereby information from different users can selectively (e.g., at their discretion) assist in providing suggestions to another user. Though not depicted in the figure, the user can also locate others that have similarly created profiles. In particular, such searches for other humans can be performed in a privacy-preserving manner.

Conventional systems offer some common aspects of collaborative filtering such as offering users the ability to store their favorites or their searches and then combining the information from different users to provide suggestions. However, the present invention is applicable to the entire Internet or World Wide Web, for example, rather than to a particular website. Furthermore, users can control the use and dissemination of their information or profiles, which is not available in the conventional systems. Finally, users can easily and readily modify their profiles without needing to return to particular web pages or websites which is another distinct advantage over traditional systems.

Figure 5:
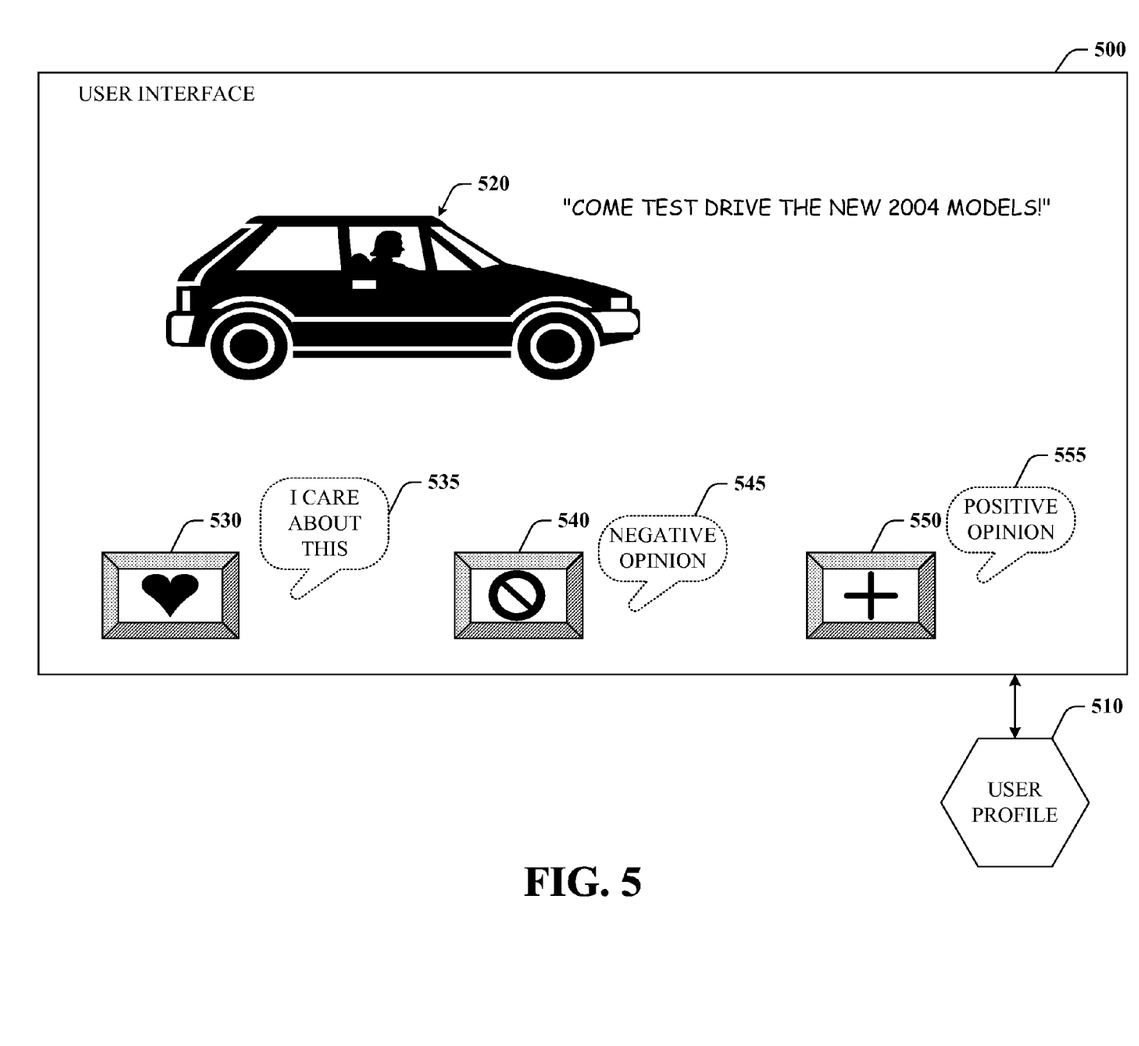
FIG. 5 is a schematic diagram of an exemplary user interface including UI buttons or input components in accordance with an aspect of the present invention.

Turning now to FIG. 5, there is illustrated an exemplary user-interface 500 as displayed to user in accordance with the present invention. The user-interface 500 is operatively coupled to a user profile 510 (and/or user profile component—not shown). The user-interface 500 comprises an image 520 of a car with an ad-line "COME TEST DRIVE THE NEW 2004 MODELS". As can be seen from the contents of the page, the subject matter is cars and/or 2004 model cars.

Also included on the user-interface 500 are user-interface buttons 530, 540, and 550. Each button is associated with a different semantic. For example, button 530 indicates "I care about this" 535; button 540 declares "negative opinion" 545, and button 550 expresses "positive opinion" 555. The user can select or click on one more buttons such as "I care about this" and "positive opinion". Inconsistent declarations can be verified by the profile component (e.g., FIG. 1, 130) or some other appropriate component or system. Alternatively, they can be left in the profile and later modified by the user at the user's discretion.

It should be appreciated that the bubbled declarations can appear to the user when hovering over the particular button with a pointer device (e.g., mouse). More specifically, one button can offer a user more than one declaration from which to select, whereby the different options can appear as a pop-up list when hovering or clicking on the button. For example, for any one button representing a positive declaration, the user can be given selections such as "I like this"; "I love this"; "I own this and want more"; and/or "I and everyone I know own this". Hence, a range of positive declarations are provided to the user for the user's selection. In addition, symbols, where appropriate, can be visualized on the respective buttons. It should also be understood that the user-interface 500 is not drawn to scale and that the size of the buttons, for example, is greatly exaggerated for illustrative purposes.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
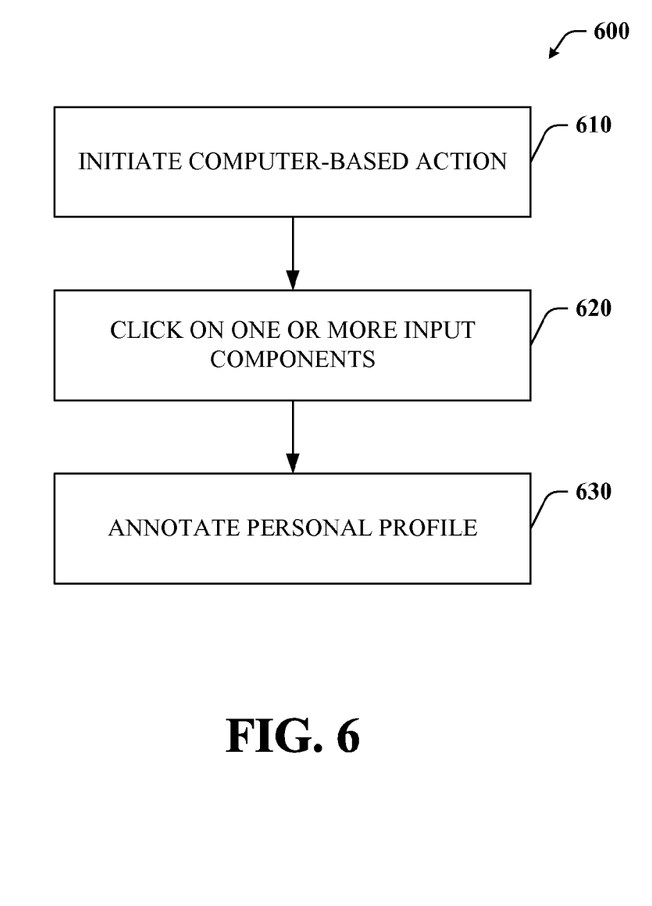
FIG. 6 is a flow diagram of an exemplary method for generating private user profiles in an implicit manner such as while performing a browsing activity in accordance with an aspect of the present invention.

Referring now to FIG. 6, there is illustrated a flow diagram of an exemplary method 600 that facilitates creating and shaping a user's personal profile in accordance with an aspect of the present invention. In particular, the method involves a computer-based action being initiated by a user at 610. The computer-based action can be a browsing or searching function, whereby the user can view particular sites or pages of information as a result of the browsing or searching. For example, the user can input a search request and as a result of such request, the user may be directed to a particular page.

At 620, the user can click on one or more input components, as appropriate, to declare his relationship with the content of that particular page. The relationship may indicate that the user is interested in the content or at least some of the content on the page. By clicking on this particular input component as well as future input components on subsequent pages, the user is annotating his personal profile at 630 implicitly as he browses. After any number of annotations, the user's personal profile can be described as reflecting the opinions or thoughts, expertise or experiences of the user. The information included in such personal profiles can be useful to others such as when they desire to take advantage of the user's expertise or wisdom before buying a product, for instance.

Figure 7:
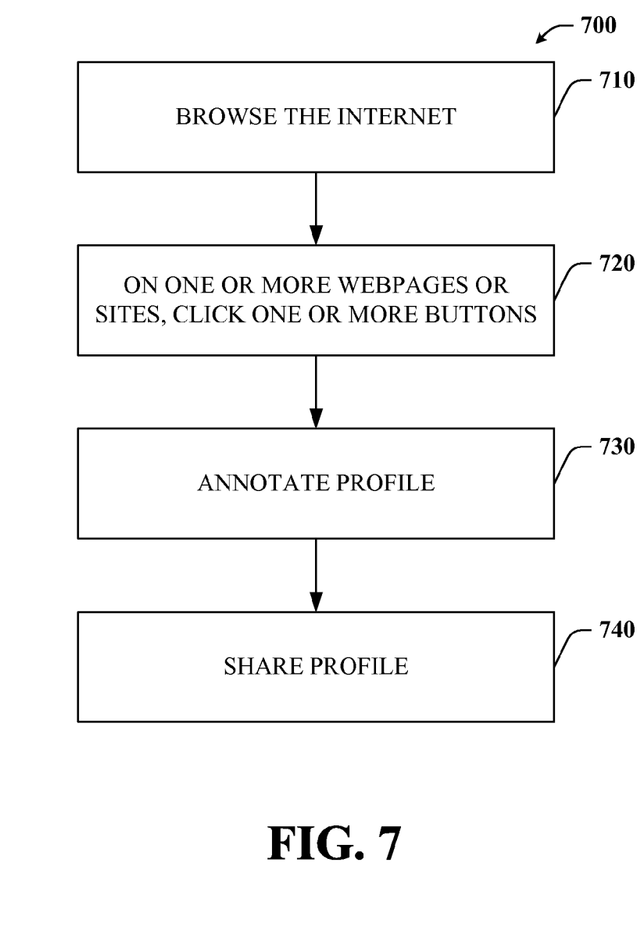
FIG. 7 is a flow diagram of an exemplary method for generating private user profiles in an implicit manner and coincident with browsing the internet and sharing the profile with other users at the user's discretion in accordance with an aspect of the present invention.

Referring now to FIG. 7, there is illustrated a flow diagram of an exemplary method 700 that facilitates conveying opinions about a particular subject matter from one user to another. The method 700 involves a user browsing the internet at 710. At 720, the user clicks one or more buttons on one or more web pages (or websites), thereby making declarations concerning the type of relationship the user has with each particular web page. At 730, the user's personal and private profile is annotated with the user's declarations. The user maintains and controls the privacy of his profile. Thus, at 740, the user can opt to share his profile with other users who have also opted to share their own profiles. Alternatively, the user can decide to make his profile available and accessible by all users. Furthermore, the user can selectively make some portions of this profile public while keeping other portions private.

Figure 8:
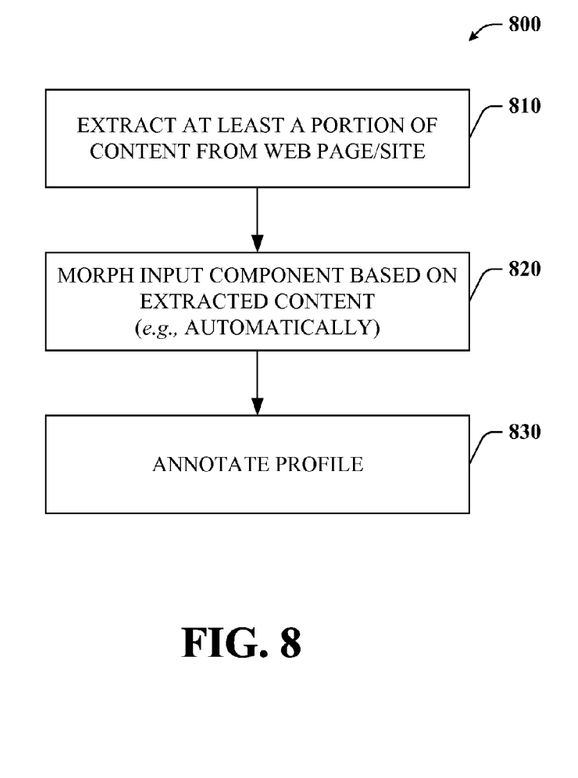
FIG. 8 is a flow diagram of an exemplary method that facilitates making declarations about one's opinions to annotate one's personal profile in accordance with an aspect of the present invention.

Turning now to FIG. 8, there is illustrated a flow diagram of an exemplary method 800 of enhancing the types of declarations a user makes regarding his relationship with particular web pages, for example. The method 800 can begin at about 810, wherein at least a portion of a web page is extracted therefrom by an extraction component. At 820, one or more input components or buttons can be morphed automatically based at least in part upon the extracted content. Hence, the input components are semantic-centric and can better describe a relationship the user may have with at least a portion of the content on a web page. For example, the extracted content may include car stereo equipment. Thus, instead of the user merely declaring "I am into this", the user can instead declare "I own this stereo" or "This brand is reliable". The user's profile is annotated at 830 with each click of an input component.

Figure 9:
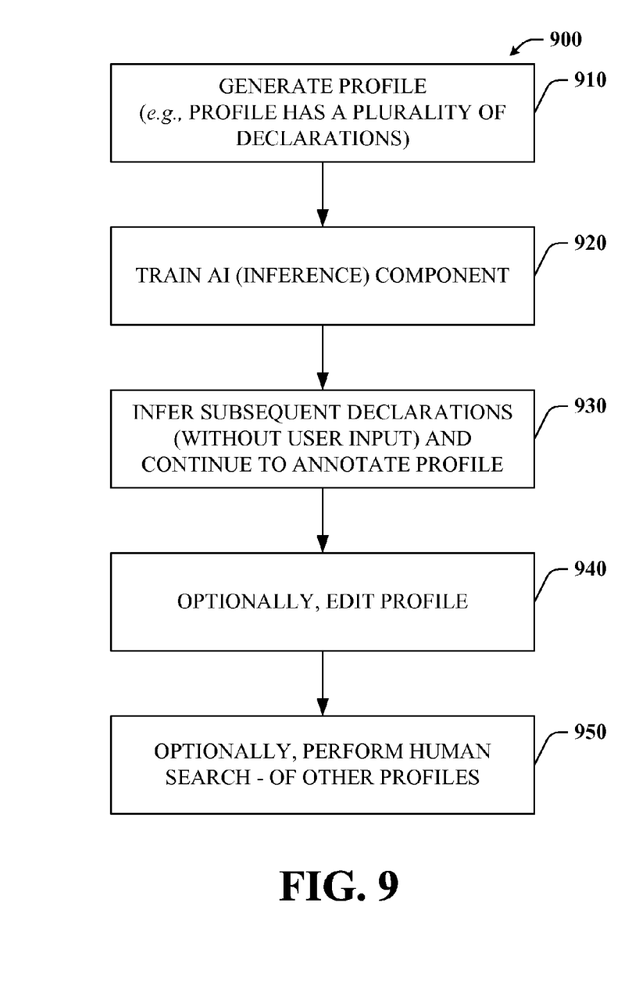
FIG. 9 is a flow diagram of an exemplary method that facilitates generating user profiles by inference on behalf of the user and optionally performing human profile searches in accordance with the present invention.

Referring now to FIG. 9, there is illustrated a flow diagram of an exemplary method 900 that improves and enhances a user's experience by allowing users to exchange and/or share personal opinions to other users at their discretion. The method comprises generating a profile at 910. The profile is personalized or specific to a particular user and can include a plurality of declarations already made by that user as described hereinabove.

As these previous declarations were being made by the user, an inference or AI component is trained at 920 to learn how or by what manner the user is making such declarations. When the inference component has been sufficiently trained, it can infer and make subsequent declarations on behalf of the user at 930 such that the user's profile can continue to be annotated without the user's physical input. Since making declarations can be at the user's discretion, the inference component can also infer when it is appropriate to declare the user's opinion or relationship with respect to the page or site based in part upon the user's pattern of discretion.

At 940, the user can optionally edit his profile as needed or desired. Just as others can have access to the user's profile, the user can also have access to the profiles of others. Hence, at 950, the user can optionally perform human searches, for example, to locate other profiles that are similar to his profile in at least one aspect. This can be accomplished in part by the user's computer. The computer or machine being employed by the user can read and search other user profiles to find other users that have information or expertise on a subject. When a match or near-match is found, the computer can notify its owner that this other user can perhaps be contacted to learn more on the particular subject of interest. Finding other people that have similar opinions, expertise, and/or experiences as the user can be helpful to the user in any number of ways for any number of reasons.

Moreover, the present invention facilitates populating a plurality of user profiles implicitly as they browse through web pages, for example. Thus, users are not forced to explicitly enter all of the many facets of their personalities to construct a huge taxonomy from scratch. Rather, the present invention can accomplish this in part by leveraging the taxonomy already implicit in search engines. Furthermore, by allowing users to shape their own profiles via their implicit actions when interfacing with various search engines or web pages, for example, more accurate personal profiles can be created. In addition, user profiles generated in this matter can be read and searched by machines (e.g., computers), which facilitates the implicit as well as explicit sharing of user experiences, opinions, and expertise. Finally, a collaborative filtering environment can be produced as a result of sharing user profiles albeit at the discretion of the individual users. Therefore, others are provided with a direct benefit from having the ability to access and view user profiles. This practice runs contrary to traditional systems that merely benefit the users (e.g., those who create the profile) themselves.

Figure 10:
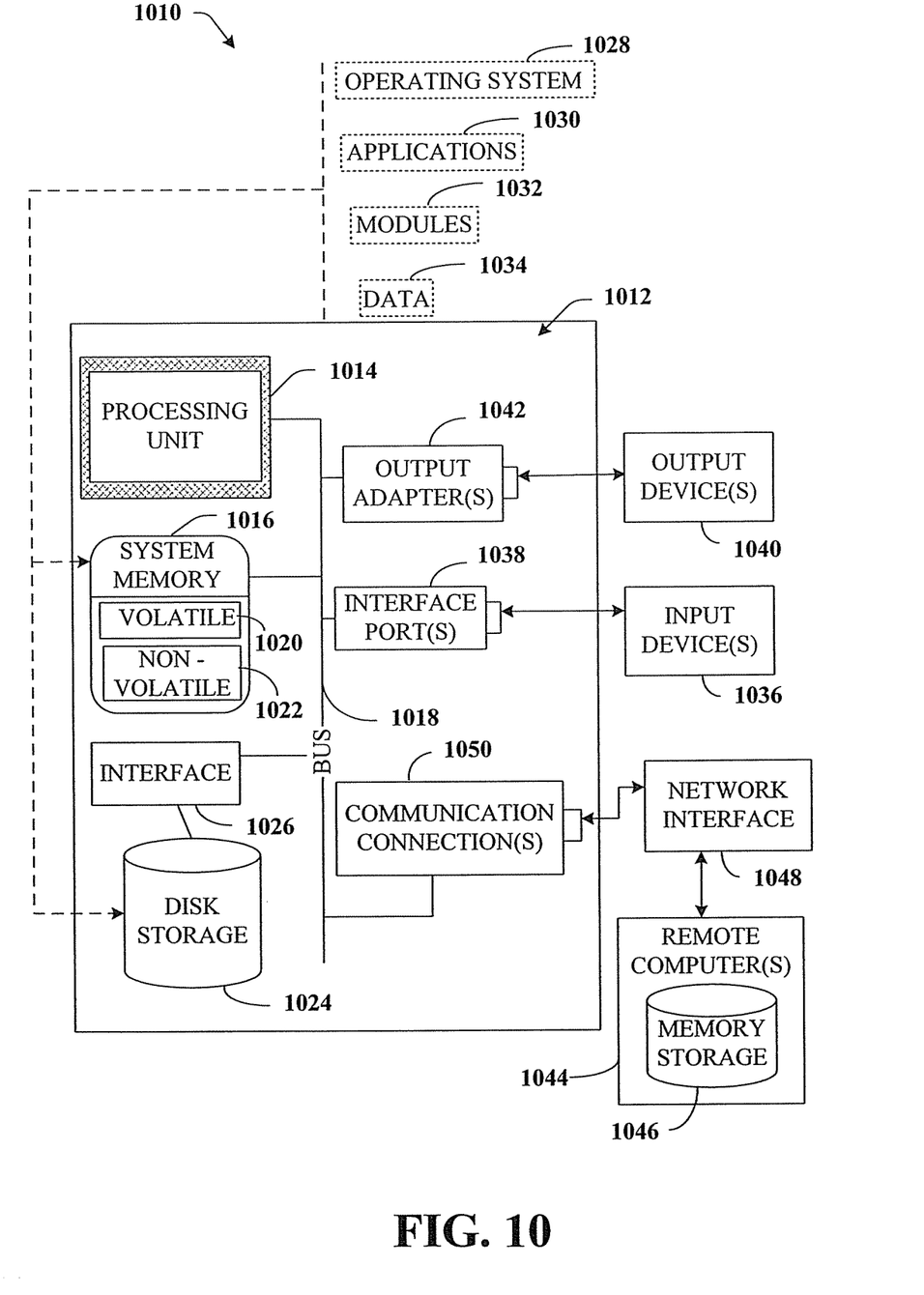
FIG. 10 is a schematic block diagram of an exemplary communication environment in accordance with the present invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples the system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates populating a sharable user profile, the system comprising:
    one or more processors;
    a memory, accessible by the one or more processors;
    an input component stored in the memory and executable on the one or more processors that displays a selectable user-interface button having at least one opinion or declaration; and
    one or more components stored in the memory and including computer-executable instructions that when executed on the one or more processors perform operations comprising:
        providing a first user interface including first content and the user-interface button;
        performing an analysis of at least a portion of the first content to determine a first group of one or more words, letters, symbols, or a combination thereof, to display on the user interface button and to determine a first opinion or declaration corresponding to the first group, the first opinion or declaration indicating a first relationship of a user with the at least a portion of the first content;
        storing the first opinion or declaration in a profile of the user based at least partly on selection of the user interface button in the first user interface;
        providing a second user interface including second content and the user-interface button, the second content being different from the first content;
        performing an analysis of at least a portion of the second content to determine a second group of one or more words, letters, symbols, or a combination thereof, to display on the user interface button and to determine a second opinion or declaration corresponding to the second group, the second opinion or declaration being different from the first opinion or declaration and the second opinion or declaration indicating a second relationship of the user with the at least a portion of the second content;
        storing the second opinion or declaration in the profile of the user based at least partly on selection of the user interface button in the second user interface.

2. The system of claim 1, wherein the operations further comprise:
    analyzing the at least a portion of the first content to extract first semantic components from the first user interface; and
    analyzing the at least a portion of the second content to extract second semantic components from the second user interface, wherein the first opinion or declaration is based at least partly on the first semantic components and the second opinion or declaration is based at least partly on the second semantic components.

3. The system of claim 2, wherein the at least a portion of the first content and the at least a portion of the second content comprises one or more of a web page, a video, or music.

4. The system of claim 1, wherein the operations further comprise searching profiles of additional users to locate an additional user having a profile including an aspect similar to an aspect of the profile of the user.

5. The system of claim 1, wherein the profile of the user is associated with an internet social network.

6. The system of claim 5, wherein aspects of the profile of the user are sharable with other users of the internet social network and at least a subset of shared aspects of the profile of the user dynamically reflect updates to the profile of the user related to one or more selections of the user-interface button by the user.

7. The system of claim 6, wherein the subset of shared aspects at least in part communicate to the other users of the internet social network one or more opinions or declarations by the user based at least in part on the one or more selections of the user interface button.

8. The system of claim 7, wherein one or more of web content, video, or music related to the one or more opinions or declarations by the user are accessible to the other users of the internet social network.

9. The system of claim 1, wherein the operations further comprise facilitating formation of the first opinion or declaration for selection by the user reflecting a relationship between a current computer-based interaction and the user, wherein the inference component comprises one or more of a support vector machine (SVM), a naive Bayes model, a Bayesian network, a decision tree, a Hidden Markov Model (HMM), a neural network, or a data fusion engine.

10. A computer-implemented method that facilitates populating a sharable user profile, the method comprising:
   analyzing first amounts of time spent by a user on web pages on which the user has previously made declarations or opinions;
   providing a web page for display on a computer system;
   determining a second amount of time spent by the user on the web page;
   inferring a declaration or opinion about the web page based, at least in part, on analyzing the first amounts of time and on the second amount of time; and
   populating a profile of the user, the profile of the user indicating the declaration or opinion about the web page.

11. The method of claim 10, further comprising:
   providing an additional web page for display on the computer system; and
   providing a user interface button in the additional web page, the user interface button indicating an additional declaration or opinion corresponding to content of the additional web page.

12. The method of claim 11, further comprising determining the additional opinion or declaration based at least in part on analyzing content of the additional web page.

13. The method of claim 11, wherein providing the user-interface button in the additional web page is related to a desire of the user to share the one or more of the webpage, visual content, or audio content with other disparate users.

14. The method of claim 13, wherein the user can share at least a portion of the profile of the user.

15. The method of claim 10, wherein the user can share access to one or more of web content, visual media, or audible media, with other users of an internet social network.

16. The method of claim 11, wherein the additional declaration or opinion is expressed as a group of one or more words, letters, symbols, or a combination thereof, on the user interface button.

17. The method of claim 16, further comprising modifying the user interface button to express another declaration or opinion using a different group of one or more words, letters, symbols, or a combination thereof, based at least in part on content of another web page accessed by the user.

18. A computer-implemented method that facilitates conveying information in an internet social networking environment about a user to other users, the method comprising:
   determining a number of opinions or declarations regarding a web page;
   analyzing content of the web page to narrow the number of opinions or declarations regarding the web page to identify an opinion or declaration corresponding to a portion of the web page;
   displaying the opinion or declaration regarding the portion of the web page for selection on the web page; and
   populating a user profile associated with the social networking environment based, at least in part, on a selection by the user of the opinion or declaration regarding the portion of the web page, the opinion or declaration indicating a relationship of the user with the portion of the web page.

19. The method of claim 18, further comprising facilitating sharing of one or more of web pages, web content, videos, or music between the user and other users of the internet social networking environment through the populating of the user profile.

20. The method of claim 18, wherein the opinion or declaration regarding the portion of the web page is displayed on a user selectable user interface component that includes a user interface button effecting sharing of the opinion or declaration by the user by way of the user profile upon selection of the user interface button.

* * * * *